(No Model.) 3 Sheets—Sheet 1.

H. D. PEARSALL.
VALVE.

No. 373,848. Patented Nov. 29, 1887.

Witnesses:
Will T. Norton
J. F. Reily

Inventor.
Howard D Pearsall
by John J. Halstead & Son
his Attys.

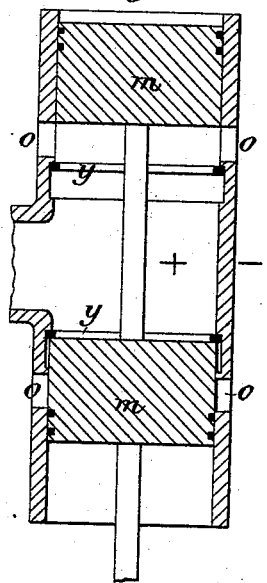
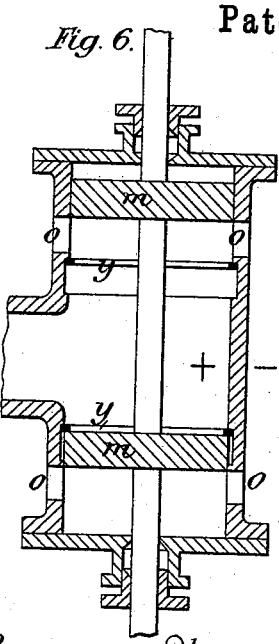
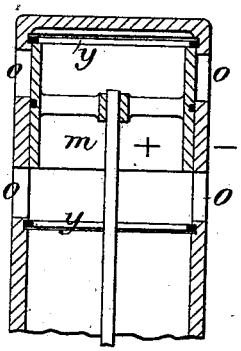
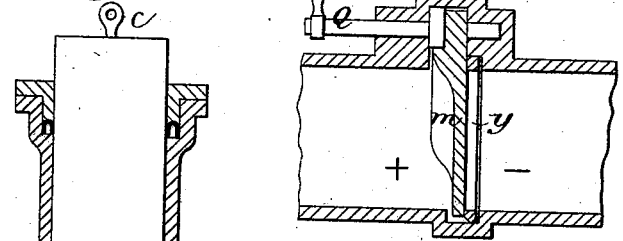
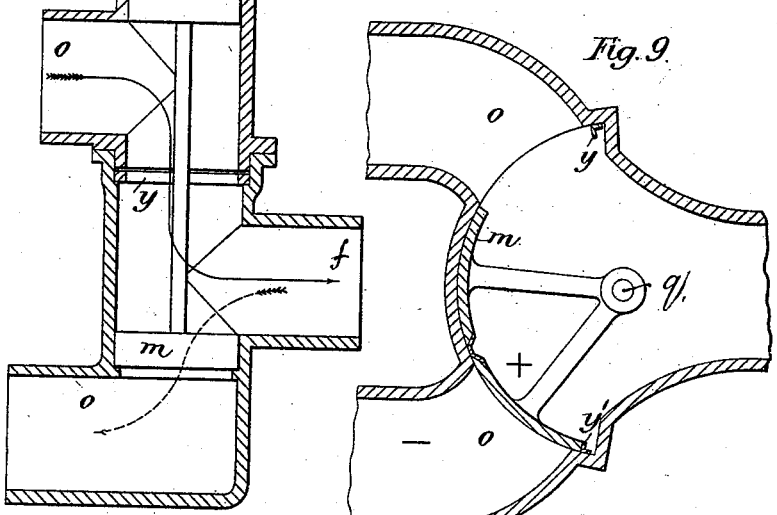

(No Model.) 3 Sheets—Sheet 3.
H. D. PEARSALL.
VALVE.

No. 373,848. Patented Nov. 29, 1887.

Witnesses:
Will T. Norton
J. F. Reily

Inventor.
Howard D. Pearsall
by John J. Halsted & Son
his Attys

UNITED STATES PATENT OFFICE.

HOWARD D. PEARSALL, OF LONDON, ENGLAND.

VALVE.

SPECIFICATION forming part of Letters Patent No. 373,848, dated November 29, 1887.

Application filed September 21, 1886. Serial No. 214,185. (No model.) Patented in England July 3, 1885, No. 8,086; in Belgium March 27, 1886, No. 72,533; in France March 30, 1886, No. 175,117; in Germany June 10, 1886, No. 41,147; in Italy June 30, 1886, XX, 19,739, XXXIX, 252; in India July 12/20, 1886, No. 119; in Spain August 10, 1886, No. 9,023; in Austria-Hungary August 21, 1886, No. 12,452 and No. 40,332; in Brazil October 16, 1886, No. 399, and in Canada April 9, 1887, No. 26,427.

*To all whom it may concern:*

Be it known that I, HOWARD DEVENISH PEARSALL, a subject of the Queen of Great Britain, residing at London, England, have invented new and useful Improvements in Valves, (for which I have obtained Letters Patent in the following countries, namely: in England, No. 8,086, dated July 3, 1885; in Belgium, No. 72,533, dated March 27, 1886; in France, No. 175,117, dated March 30, 1886; in Germany, No. 41,147, dated June 10, 1886; in Italy, Vol. XX, No. 19,739, Vol. XXXIX, No. 252, dated June 30, 1886; in India, Register No. 119 of 1886, dated July 12/20, 1886; in Spain, No. 9,023, dated August 10, 1886; in Austria-Hungary, No. 12,452 and No. 40,332, dated August 21, 1886; in Brazil, No. 399, dated October 16, 1886, and in Canada, No. 26,427, dated April 9, 1887,) of which the following is a specification.

The present improvement consists in making the seat of a valve movable or flexible in such a manner that when the valve is moved to a position near to or touching its seat the said seat is pressed against the valve by any fluid-pressure which exists in the apparatus instead of the valve being pressed against its seat by such fluid-pressure.

In the following figures this invention is shown as applied to various kinds of valves in order to make clear the way of carrying out the invention. + denotes on which side of the valve is the fluid-pressure.

Figures 1, 2, 2ª, and 3 illustrate my invention with the valve formed as a hollow piston. Fig. 4 shows the same kind of valve placed outside instead of inside the pipe. Figs. 5, 6, and 7 illustrate my invention as applied to double-acting piston-valves; Fig. 8, a similar double valve with alternate fluid-passages. Fig. 9 shows my invention as applied to a shutter-valve. Fig. 10 shows the invention as applied to another form of shutter-valve. Figs. 11, 12, and 13 show its application to still other forms of shutter-valves. Figs. 14 and 15 show its application to throttle-valves. Fig. 16 shows it applied to a double-beat lift-valve.

In Figs. 1, 2, 2ª, 3 the valve is a hollow "piston-valve," and consists of a hollow cylinder, $m$, sliding in a pipe, $f$, so as to alternately cover and uncover orifices $o\ o$. $y$ in these and in all other figures is the movable or flexible seat constituting the present invention, and may consist of a metallic packing-ring capable of a small sliding motion in the pipe $f$, as in Fig. 1, or of a ring of leather or other flexible material attached to the pipe $f$, as in Fig. 2, or of rubber, as in Fig. 2ª, or of a small packed piston, as in Fig. 3. The lower end of the valve is made to fit water-tight against the pipe in any ordinary way.

The action is as follows: The valve $m$ being moved to a position covering the orifices $o\ o$ and close to the seat $y$, and there being some fluid-pressure in the pipe $f$, said fluid-pressure presses the seat $y$ against the edge of the valve $m$ and makes a water-tight joint.

In Fig. 4 the same kind of valve is shown applied outside a pipe, $f$, instead of inside, and is applicable where the fluid-pressure is outside the pipe.

In Figs. 5, 6, 7 "double piston-valves" $m\ m$ are shown, provided with same movable seats, $y$. Fluid entering at $f$ escapes alternately by orifices $o\ o$ and $o\ o$.

In Fig. 8 a similar double valve is shown, the passage of fluid being alternately from $o$ to $f$ and from $f$ to $o$.

In Fig. 9 a "shutter-valve" is shown, consisting of a segment of cylinder $m$, connected to a shaft, $q$, which has an oscillating movement, so that the valve $m$ is brought alternately against the seat $y$ and the seat $y'$.

In Fig. 10 another shutter-valve or "sluice-valve" is shown, consisting of a plane disk, $m$, connected to a shaft, Q, which has an oscillating movement, so that the disk alternately fills the bore of the pipe $f$ and is removed to one side of it, as in ordinary sluice-valves. When the disk $m$ fills the bore of the pipe, the fluid-pressure presses the ring $y$ against the disk and equally against the surface of the pipe $f$ and makes a water-tight joint.

In Figs. 11, 12, 13 a shutter-valve is also shown, but arranged so that the disk is always *in equilibrio*.

Figure 1:
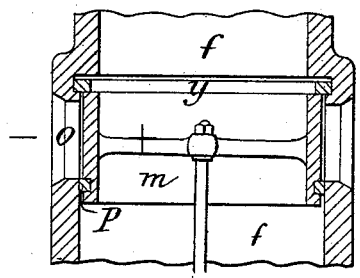
Figure 2:
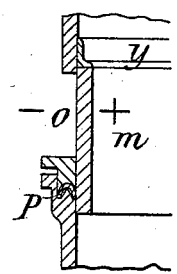
Figure 2A:
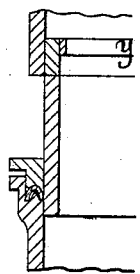
Figure 3:
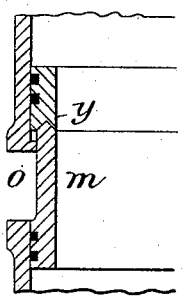
Figure 4:
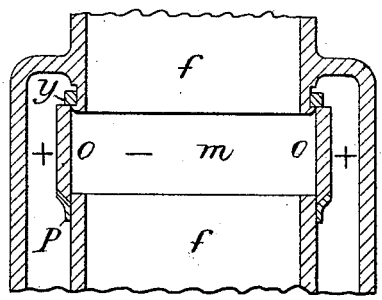
Figure 11:
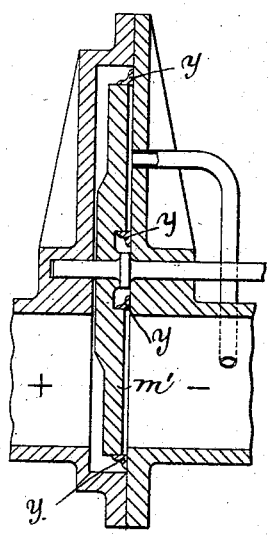
Figure 12:
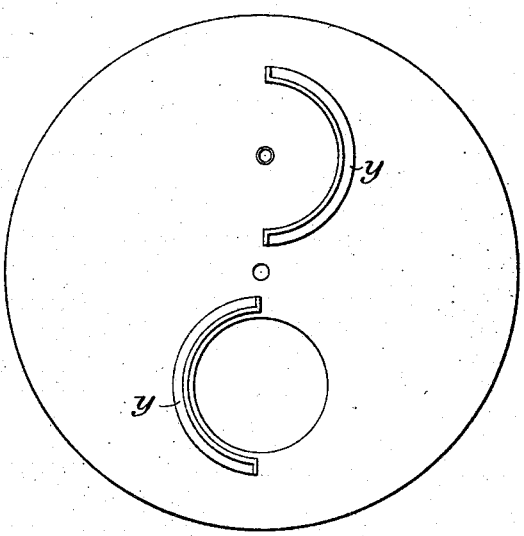
Fig. 12 is a view of the plate or casing $b$, to which are attached flexible seats $y$, which are pressed against the edges of the disk when said disk closes the pipe $f$.
Figure 13:
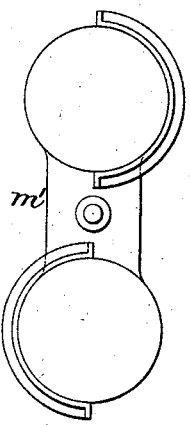
Fig. 13 is the disk, to part of the periphery of which is attached leather packing $a\ a$.
Figure 15:
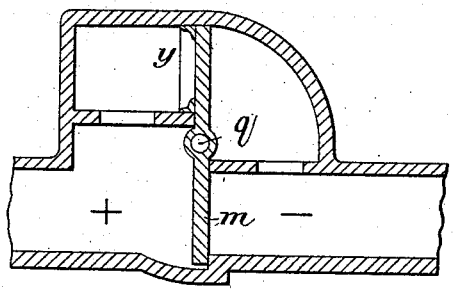
Figure 14:
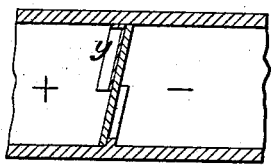

In Figs. 14, 15 two forms of "throttle-valve" are shown, in which the valve consists of a plate, $m$, oscillating about a center, $q$.

Figure 16:
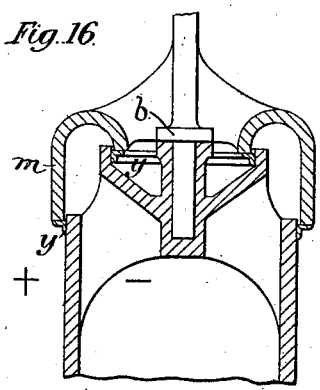

In Fig. 16 a double-beat "lift-valve" is shown. The motion downward of the valve is limited by the collar $b$, so that it does not rest on the seats $y$, but these seats are pressed against the valve by the fluid-pressure.

Having now particularly described and ascertained the nature of my said invention and in what manner the same is to be performed, I declare that what I claim is—

In valves for gas or liquids, the tightening-ring $y$, which constitutes the valve-seat, in combination with the casing and a valve proper, the said ring being free to move a short distance in a direction opposite to that of the valve, whereby, when such valve is moved to a position near to the seat, the said ring $y$ is pressed against the valve by fluid-pressure existing in the apparatus, substantially as described, and for the purpose set forth.

H. D. PEARSALL.

Witnesses:
  JOHN FEGAN,
  W. S. PHILLIPS,
*Clerks with Messrs. Neve & Cresswell, Solicitors, Wolverhampton.*